US006077207A

United States Patent [19]

Yokoyama et al.

[11] Patent Number: 6,077,207

[45] Date of Patent: Jun. 20, 2000

[54] PRINTING WEB TRANSPORTING ROLLER

[75] Inventors: Kazuhiro Yokoyama; Kunihiro Umezu, both of Hyogo; Noriyuki Shiba, Tokyo, all of Japan

[73] Assignees: Yoshikawa Kogyo Co., Ltd.; Kabushiki Kaisha Tokyo Kikai Seisakusho; Nippon Steel Chemical Co., Ltd., all of Japan

[21] Appl. No.: 09/159,134

[22] Filed: Sep. 23, 1998

[30] Foreign Application Priority Data

Dec. 3, 1997 [JP] Japan .................................... 9-333340

[51] Int. Cl.$^7$ ...................................................... B23P 15/00

[52] U.S. Cl. .................................. 492/30; 492/52; 492/18

[58] Field of Search .................................. 492/30, 53, 18, 492/25, 52, 56, 59, 51

[56] References Cited

FOREIGN PATENT DOCUMENTS

| | | |
|---|---|---|
| 60-214958 | 10/1985 | Japan . |
| 61-104061 | 5/1986 | Japan . |
| 61-96063 | 5/1986 | Japan . |
| 4-310741 | 11/1992 | Japan . |
| 4-7378 | 2/1994 | Japan . |
| 6-207614 | 7/1994 | Japan . |
| 5-246003 | 12/1995 | Japan . |
| 6-106702 | 12/1995 | Japan . |
| 9-175703 | 7/1997 | Japan . |

*Primary Examiner*—David P. Bryant
*Assistant Examiner*—Marc W. Butler
*Attorney, Agent, or Firm*—Mathews, Collins, Shepherd & Gould, P.A.

[57] ABSTRACT

A printing web transporting roller is disclosed which is characterized by using as the roller basis thereof a roller basis made of a fiber-reinforced plastics and provided on the peripheral surface thereof with a plurality of portions of a surface of large curvature and a plurality of portions of a surface of small curvature alternately arranged in a mutually adjoining state and having a composite coating film superposed on the roller basis and composed of a porous ceramic layer formed by thermal spraying and a resin layer formed on the surface of the ceramic layer and inside the pores in the ceramic layer.

19 Claims, 2 Drawing Sheets

PRINTING WEB TRANSPORTING ROLLER

BACKGROUND OF THE INVENTION

1. Field of the Invention

This invention relates to an improvement in and concerning a roller transporting printing web or sheets in a varying printing device (hereinafter it is called "printing web transporting roller"), and more particularly to an improvement in and concerning a roller such as a guide roller which is used in various types of rotary press.

2. Related Art

The printing technique consists in reproducing information composed of letters or other figures in a large quantity as hard copies portraying an identical image or printed matter on the surfaces of papers or other printing sheets or web. The printing devices which are used in the printing technique for forming the printed matter by depositing a coloring material such as ink on a printing plate and impressing the surface of a printing sheet or web to the plate and thereby transferring the coloring material onto the surface of the printing sheet or web, as widely known, vary according to the form of a printing plate and the mode of transfer of the ink from the printing plate to the printing sheet or web (direct printing or indirect printing system) among offset printing apparatus, letterpress printing apparatus, flexographic printing apparatus, gravure printing apparatus, screen printing apparatus, etc.

Though these printing presses vary according to the choice between requiring a printing plate to be directly impressed on a printing sheet or web and requiring an intermediate such as a rubber blanket to which the ink has been preparatory transferred from a printing plate to be impressed on a printing sheet or web, they share a major common concept of causing the ink on such a printing element (printing plate or intermediate) to be transferred to a printing sheet or web and they predominantly share in common the construction of a printing sheet or web impressing and transporting mechanism for pressing the printing sheet or web on the printing element and then transporting the printing sheet or web.

When a web, i.e., continuous strip, of paper wound up in the form of a roll is used for offset printing, an ink image is formed by causing an ink to be transferred from a plate cylinder to a blanket cylinder and then transferred by impression onto the surface of the web being passed between the blanket cylinder and an impression cylinder. The web having the ink image formed on the surface thereof is subsequently transported in changed directions by a plurality of guide rollers and passed along the interior of the press.

In the rotary press for continuously printing to the web of paper or film paid out of a roll, the web transporting system thereof is provided with numerous guide rollers. The transporting system using these guide rollers is furnished not only in the rotary offset presses (newspaper rotary offset press, commercial rotary offset press, and business form printing press) but equally in the web-fed rotary gravure rotary press, flexographic rotary press, rotary letterpress machine, etc.

Most guide rollers heretofore used in the rotary presses have been produced by forming iron pipes and plating their surfaces with chromium or faithfully repeating this procedure while using aluminum alloy pipes as bases in the place of iron pipes for the sake of decreasing weight. Further, the guide rollers which have their surfaces (1) knurled, (2) covered with a tape having a surface coarsened after the fashion of a sandpaper, or (3) coated with a ceramic layer deposited by thermal spraying for the purpose of preventing the printing sheet or web from slippage and protecting it against possible adhesion of ink due to the point contact effect have been heretofore known.

The guide roller which is an aluminum alloy pipe furnished with a knurled surface has such poor resistance to abrasion as suffers early loss of protuberances of knurl and consequent appearance of inclination to slippage. The guide roller which is covered with a tape having a surface coarsened after the fashion of a sandpaper is likewise incapable of offering a long service life because sand beads fall off the tape and the tape peels off after a short use. While the guide roller which is coated with a ceramic layer deposited by thermal spraying is highly resistant to abrasion and extremely effective in terms of resistance to slippage, it is at a disadvantage in developing the following problem of prominent inclination to adhesion of ink.

The surface of the guide roller heretofore known to the art is invariably formed of a material exhibiting a relatively high capacity for allowing the adhesion of ink. Even when the guide roller has its surface knurled, after a protracted operation of the rotary press using the guide roller, the ink image impressed on the surface of a printing sheet or web is transferred in the form of a transferred ink image to the surface of the guide roller held in contact with the printing sheet or web and the transferred ink image is reversibly transferred to the surface of the subsequent printing sheet or web and eventually suffered to smear the printed matter. In the operation of the rotary press which uses this guide roller, therefore, the guide roller must be periodically cleaned. The cleaning work interrupts the printing operation and imposes a heavy load thereon. If the cleaning work is neglected, the printing operation incurs the trouble of impairing the quality of the printed matter to be produced.

Particularly in the case of the guide roller which is coated with a ceramic layer formed by thermal spraying, the ink seeps into and deposits on the depressions which are formed on the coarse surface resulting from the thermal spraying. The deposited ink in the depressions is not easily removed by simply wiping the coarse surface. When the coarse surface is cleaned with a solvent, the ink dissolved in the solvent migrates by permeation into the pores in the ceramic layer formed by thermal spraying. Thus, the cleaning work is difficult to carry out.

Recently, for the guide roller under discussion, it has been proposed to use a roll which is made of fiber-reinforced plastics such as carbon fiber-reinforced plastics (CFRP) for the reason that the roll has high rigidity and light weight and allows the increase of operating speed of the printing press.

Since the roll which is made of a fiber-reinforced plastics has poor surface resistance to abrasion and possibly induces the phenomenon of scuffing, it has been proposed to plate its surface with a Cr layer for the purpose of liberating it from the drawbacks or to form on its surface a coat of a metallic or ceramic material by thermal spraying, a rather simple work, for the purpose of obviating the necessity of performing a troublesome plating work (JUM-B-04-7,378, JP-A-60-214,958, JP-A-61-96,063, and JP-A-61-104,061).

The guide roller which uses a roll of such fiber-reinforced plastics as mentioned above as its basis offer no perfect solution to its problem concerning the adhesion of ink or the defilement of the printed matter mentioned above when it has its surface coated with a layer of Cr formed by plating, a layer of a metallic material formed by thermal spraying, or a layer of a ceramic material formed by thermal spraying.

JP-A-04-310,741 and JP-A-06-207,614 have proposed rollers which are made of a fiber-reinforced plastics and which have the surfaces of the rollers coated with a fluorine resin, a silicone resin, or a fluorine and silicone-containing resin for the purpose of preventing the rollers from the defilement with ink.

The rollers which are protected solely by the coating with the resin have only sparing feasibility of being applied to such components as guide rollers which are used in the presence of an abrading action because their surface coating layers offer very poor resistance to abrasion and very quickly lose their sheet or web releasing effect owing to the abrasive contact.

Hereinafter, for the sake of simplifying this specification, regarding the printing sheet and web, the word "printing web" may be singly used in many parts of the specification. However, it would be easily understood for a person who is skilled in the art that the word may be read as the sense of the printing sheet as well as web.

In the light of such problems of the prior art as described above, the present inventors formerly proposed a printing web transporting roller which is obtained by superposing on a roller basis of fiber-reinforced plastics a composite coating film composed of a porous ceramic layer formed by thermal spraying and a layer of a resin having a low surface energy formed on the surface of the ceramic layer and inside the pores in the layer (JP-A-09-175,703).

In the printing web transporting roller, the ceramic layer formed by thermal spraying on the roller basis has a coarse surface combining short-cycle undulations (resembling pitch waves) with long-cycle undulations (resembling swell waves). When the ceramic layer is coated on the upper side thereof with the low surface energy resin by a procedure of impregnating the ceramic layer with this resin and drying the layer until the resin is solidified, the low surface energy resin layer is formed on the surface of the ceramic layer and inside the pores in the ceramic layer. The low surface energy resin, because the ceramic layer has undulations resembling pitch waves and acquires a porous texture as described above, seeps into the relevant depressions and manifests an anchoring effect consequently and forms a composite film with the ceramic layer owing to the satisfactory adhesiveness of the resin with the ceramic layer, with the result that the ceramic layer and the low surface energy resin layer will form the composite coating film. While the low surface energy resin covers the surface of the ceramic layer substantially wholly, it is deposited in a large thickness on the depressions shaped like pitch waves and in a small thickness on the protuberances shaped like pitch waves. The composite coating film, therefore, assumes a smooth surface as compared with the coating formed solely of the ceramic layer. The undulations originating in the ceramic layer formed by thermal spraying are not completely buried by the low surface energy resin and the undulations resembling swell waves are generally retained wholly. The coarse surface to be eventually formed, therefore, possesses smooth undulations.

When the printing web transporting roller contacts a printing web, therefore, the contact is not obtained on the entire roller surface but only on the surfaces of smooth protuberances. Since the surfaces engaging in this contact include the seats of the low surface energy resin, the transfer of the ink from the printing sheet does not occur easily and the ink which has been transferred at all can manifest an outstanding quality of being easily removed by a light contact of dry cloth because the surface is formed of the low surface energy resin and also because it has a profile of smooth undulations.

Further, since the layer of the low surface energy resin is deposited on the relevant surface as combined with the ceramic layer formed by thermal spraying as described above, it is not wholly abraded or peeled even after a very long use. It is worn only in the protuberances of the undulations resembling swell waves mentioned above, i.e. extremely minute sites. The roll surface, therefore, is allowed to maintain the low surface energy for a very long time and do not easily incur deterioration of properties. While the undulations resembling swell waves have been expressed as "swell" in comparison with the undulations of minute pitches, the swell is in such an extent as escapes visual detection completely. If the resin layer forming the surfaces of the protuberances is worn to expose the ceramic layer and the adhesion of ink and the reverse transfer of ink occur in the affected portions, the outcomes will not be so serious as to pose a problem from the standpoint of the quality of print.

When the printing web transporting roller constructed as described above is used for a long time, however, the layer of the low surface energy resin is worn and the ceramic layer is exposed on the minute protuberances. When the ceramic layer is exposed, though in very minute portions as described above, the adhesion of ink expands with the portions of exposure as cores possibly to the extent of entailing the problem of increasing the frequency of cleaning.

JP-B-07-119,103 and JP-B-07-119,104 disclose a guide roller which is provided on the roller surface with steps satisfying specific conditions and consequently allowed to allay the adhesion of ink by causing the roller surface to produce constant slippage with the printing web or sheets. Even the stepped guide roller has room for further improvement because the ink, once suffered to adhere to the roller surface, inevitably entails the problem concerning the removal of the adhering ink and the defilement of the printed matter with the persistent ink.

SUMMARY OF THE INVENTION

This invention, therefore, has an object of providing an improved printing web transporting roller to be used in various kinds of printing press. This invention has another object of providing a printing web transporting roller which allows a high-speed rotation, exhibits an excellent ability to follow the high-speed rotation, suffers the phenomenon of adhesion of and defilement with ink only sparingly, represses the frequency of cleaning in spite of a protracted use, and enjoys high durability.

To accomplish the objects mentioned above, the printing web transporting roller of this invention comprises a roller basis having formed on the peripheral surface thereof a plurality of portions of a surface of large curvature and a plurality of portions of a surface of small curvature alternately arranged in a mutually adjoining state and a composite coating film superposed on the roller basis and composed of a porous ceramic layer formed by thermal spraying and a resin layer formed on the surface of the ceramic layer and inside the pores in the ceramic layer.

In the printing web transporting roller of this invention, the resin which forms the resin layer is preferred to be a resin destined to for the solid of the silicone type resin low energy surface.

In the printing web transporting roller of this invention, the roller basis is preferred to be a fiber-reinforced plastics and the fiber-reinforced plastics to be a carbon fiber-reinforced plastics.

In the printing web transporting roller of this invention, the roller basis made of the aforementioned fiber-reinforced plastics is preferred to be overlaid by an undercoating layer composed of a substrate film, 30–300 μm in thickness, formed of an organic macromolecular material which is the same as or similar with the synthetic resin forming the matrix of the fiber-reinforced plastics and a surface-coarsened film, 50–300 μm in thickness, formed of an organic macromolecular material which is also the same as or similar with the synthetic resin forming the matrix of the fiber-reinforced plastics and having a surface roughness (Rz) of 40–130 μm and the undercoating layer is preferred to be overlaid by the aforementioned porous ceramic layer formed by thermal spraying.

In the printing web transporting roller of this invention, the plurality of portions of the surface of the large curvature are preferred to be present with a substantially equal width throughout the entire periphery of the roller basis and the width is preferred to be in the range of 30–80 mm.

Optionally, in the printing web transporting roller of this invention, a metallic roller basis may be used as the roller basis mentioned above.

In the printing web transporting roller of this invention, the ratio of the total area, $a_1$, of the portions of the surface of the large curvature to the total area, $a_2$, of the portions of the surface of the small curvature is preferred to be in the range of 1:1–20.

In the printing web transporting roller of this invention, the steps to be formed between the portions of the surface of the large curvature and the portions of the surface of the small curvature are preferred to be in the approximate range of 0.1–0.5 mm.

In the printing web transporting roller of this invention, the portions of the surface of the large curvature are preferred to be disposed at positions corresponding to the white part of a print to be produced on the printing web.

This printing web transporting roller is preferred to have surface attributes such that the portions of the surface of an identical curvature possess smooth undulations, typically 10–40 μm in surface roughness (Rz).

Further, this printing web transporting roller is to be capable of being properly used as a guide roller particularly for a rotary press.

This invention is also directed to a film like processing roller having a viscosity-transporting substance imparted to the surface thereof, characterized by the fact that the roller basis comprises a roller basis made of a fiber-reinforced plastics and provided on the peripheral surface thereof with a plurality of portions of a surface of large curvature and a plurality of portions of a surface of small curvature alternately arranged in a mutually adjoining state and a composite coating film superposed on the roller basis and composed of a porous ceramic layer formed by thermal spraying and a resin layer formed on the surface of the ceramic layer and inside the pores in the ceramic layer.

DETAILED DESCRIPTION OF PREFERRED EMBODIMENTS OF THE INVENTION

Now, this invention will be described in detail with reference to preferred embodiments thereof.

The printing web transporting roller according to this invention uses a roller basis which comprises a roller basis provided on the peripheral surface thereof with a plurality of portions of a surface of large curvature and a plurality of portions of a surface of small curvature alternately arranged in a mutually adjoining state and a composite coating film superposed on the roller basis and composed of a porous ceramic layer formed by thermal spraying and a resin layer formed on the surfaces of the ceramic layer and inside the pores in the ceramic layer.

Figure 1:
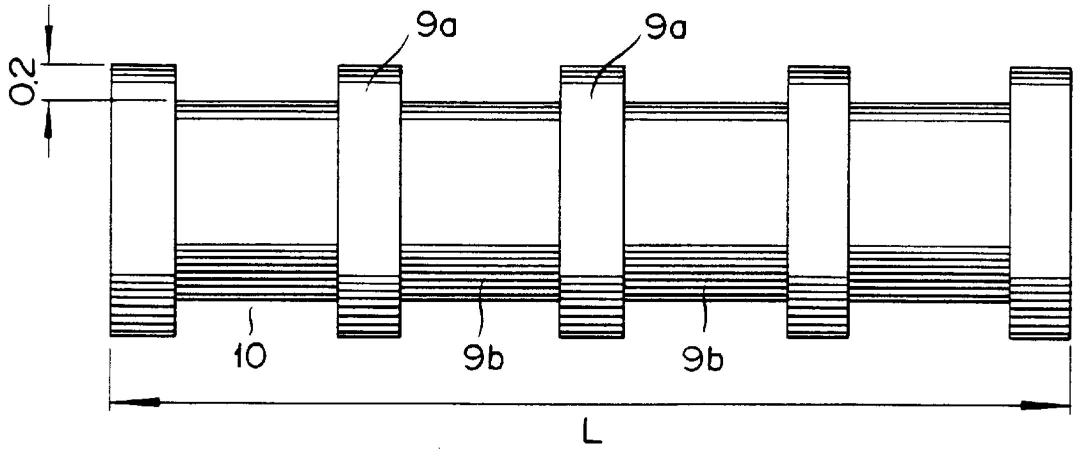
FIG. 1 is a plan view illustrating in the form of a model the shape of one example of a roller basis to be used in the embodiment of a printing web transporting roller according to this invention.
Figure 2:
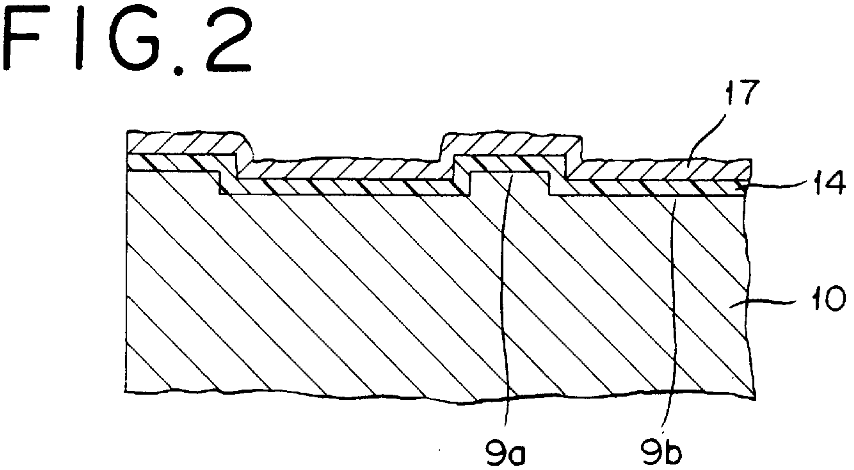
FIG. 2 is a diagram illustrating in the form of a model the sectional structure in the embodiment of the printing web transporting roller according to this invention.
Figure 3:
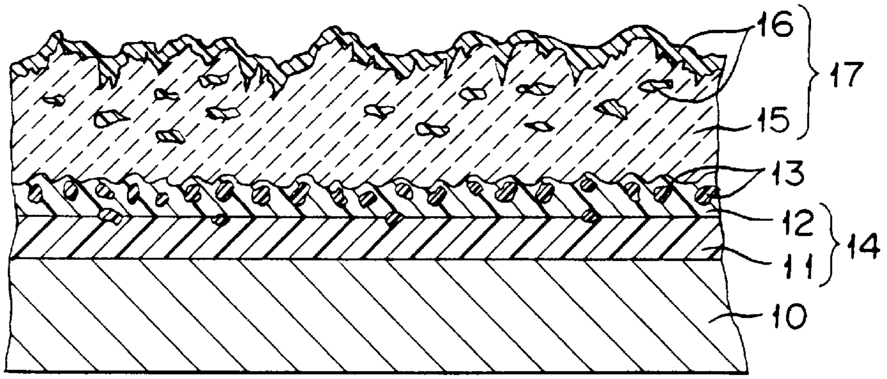
FIG. 3 is a diagram illustrating in the form of a model as magnified the sectional structure of a local surface portion of the printing web transporting roller according to this invention.
Figure 4:
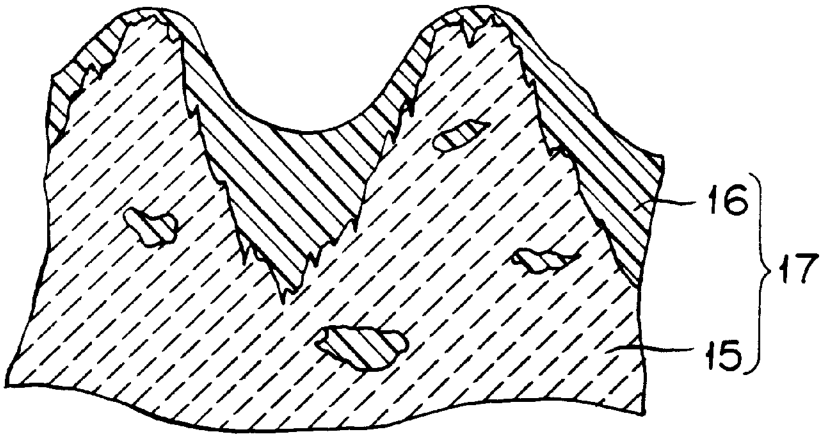
FIG. 4 is a diagram illustrating in the form of a model as further magnified the sectional structure of a local surface portion of the printing web transporting roller according to this invention.
Figure 5:
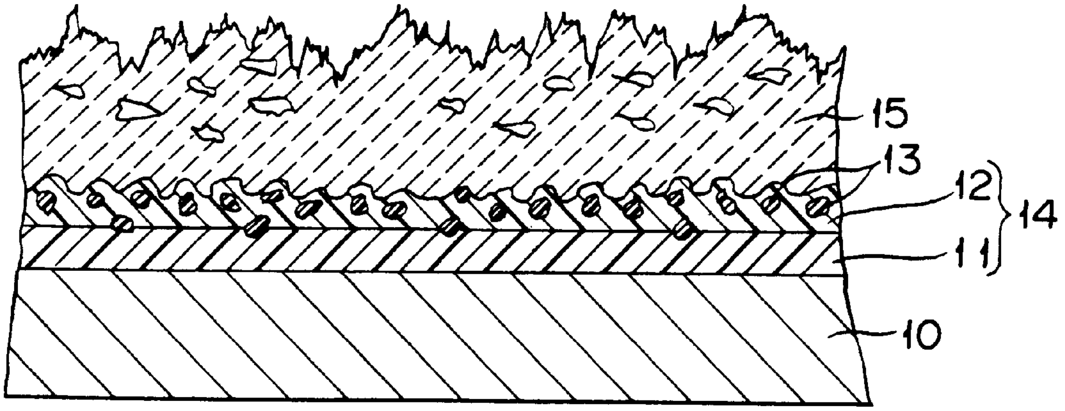
FIG. 5 is a diagram illustrating in the form of a model the sectional structure of a local surface portion in the process of manufacture of the printing web transporting roller according to this invention.

FIG. 1 is a plan view illustrating in the form of a model the visible shape of a roller basis to be used in the embodiment of a printing web transporting roller according to this invention, FIG. 2 is a diagram illustrating in the form of a model the sectional structure in the embodiment of the printing web transporting roller according to this invention, FIG. 3 is a diagram illustrating in the form of a model as magnified the sectional structure of a local surface portion of the printing web transporting roller according to this invention, FIG. 4 is a diagram illustrating in the form of a model as further magnified the sectional structure of a local surface portion of the printing web transporting roller according to this invention, and FIG. 5 is a diagram illustrating in the form of a model the sectional structure of a local surface portion in the process of manufacture of the printing web transporting roller according to this invention. Regarding these Figures, please note that the aspect ratios are deformed.

The printing web transporting roller according to this invention in the first place uses as a roller basis a roller basis 10 which, as illustrated in FIG. 1, is provided on the peripheral surface thereof with a plurality of portions of a surface of large curvature **9*a* and a plurality of portions of a surface of small curvature 9*b*** alternately arranged in a mutually adjoining state and further provided on the surfaces with macroscopic steps.

To obtain the printing web transporting roller of this invention, a ceramic layer 15 formed by thermal spraying is superposed as illustrated in FIG. 5 on the surface of the roller basis 10 which is provided on the surface thereof with the macroscopic steps as described above. In the example depicted in this diagram, an undercoating layer 14 composed of such substrate layer 11 and surface-coarsened layer 12 as will be described specifically herein below is superposed on the surface of the roller basis 10 for the purpose of improving the adhesiveness of the ceramic layer 15 and the ceramic layer 15 is formed on the undercoating layer 14. The reference numeral 13 found in the diagram represents a granular solid organic macromolecular material incorporated in the surface-coarsened layer 12.

The ceramic layer 15 which is formed as described above has a coarse surface resulting from the combination of short-cycle undulations (resembling pitch waves) forming very sharp protuberances with long-cycle undulations (resembling swell waves) as illustrated in the diagram and having a coarseness, Rz, typically preferably in the approximate range of 20–50 μm. The ceramic layer 15 has a porous texture which preferably contains minute pores, 0.1 μm—some tens of μm in diameter, at a porosity in the range of 5–20%.

At this point, a resin such as, for example, a silicone type resin which is destined to form a solid of low surface energy is caused to impregnate the ceramic layer 15 from above and then allowed to dry and solidify and coat the ceramic layer 15, with the result that a resin layer 16 will be formed on the surface of the ceramic layer and in the pores thereof as illustrated in FIG. 3 and FIG. 4. The resin layer 16, because the ceramic layer 15 possesses undulations resembling pitch waves and acquires a porous texture as described above, seeps into the relevant depressions and consequently manifests an anchoring effect and forms a composite film with the ceramic layer owing to the satisfactory adhesiveness of the resin with the ceramic layer 15, with the result that the ceramic layer 15 and the resin layer 16 will form the composite coating film 17.

While the resin layer 16 covers the surface of the ceramic layer 15 substantially wholly, it adheres in a large thickness to the depressions of pitch waves and in a smell thickness to the protuberances of pitch waves. It, therefore, assumes a smooth surface as compared with the coating formed solely of the ceramic layer 12. The undulations originating in the ceramic layer 15 formed by thermal spraying are not completely buried and the undulations resembling swell waves mentioned above are generally retained wholly and consequently enabled to form a coarse surface possessing smooth undulations. The ultimate surface roughness, Rz, is typically preferred to be in the approximate range of 10–40 μm. The protuberances in the ultimate smooth undulations (the protuberances of the swell waves mentioned above) are preferred to be uniformly dispersed at a ratio of about one piece, for example, per the square of 30 μm–the square of 60 μm. The term “protuberance” as used herein refers to the protuberances having heights of not less than 70% of the highest of the heights of all the protuberances which are found by scanning two-dimensionally a unit area, 20 mm in length×20 mm in width, of the surface of a given printing sheet.

The composite coating film 17 which is composed of the ceramic layer 15 formed by thermal spraying and the resin layer 16 as described above is formed on the roller basis 10 throughout the entire length thereof as illustrated in FIG. 2. To be specific, it is formed in a substantially equal wall thickness on both plurality of portions of the surface of large curvature 9*a* and plurality of portions of the surface of small curvature 9*b*. Even on the surface of the ultimately obtained product, the contours of the steps formed by the portions of the surface of large curvature 9*a* and the portions of the surface of small curvature 9*b* on the roller basis 10 appear prominently.

A macroscopic observation of the contact to be established between the printing web transporting roller of this invention constructed as described above and the printing web reveals that the surface pressure with the printing web is predominantly received in the positions of the portions of the surface of large curvature 9*a* of the roller basis 10 (the composite coating film 17 formed on the portions of the surface of large curvature 9*a*) and supplementary received in the positions of the portions of the surface of small curvature 9*b* (the composite coating film 17 formed on the portions of the surface of small curvature 9*b*).

An observation of this contact to be made microscopically, or locally in one of the portions of the surface of curvature 9*a* or 9*b*, reveals that the roller does not use the whole surface thereof but uses only the smooth protuberances for the contact. Since the surface of the roller seats the low energy surface resin, the transfer of the ink from the printing sheet to this roller does not easily occur.

Again in the macroscopic observation, the resin layer 16 positioned in the uppermost surface of the component coating film 17 formed on the surface of the roller vanishes in consequence of abrasion within a relatively short span of time because the surface pressure of the roller with the printing sheet is large and the printing web and the roller surface constantly produce minute slippage. In spite of the expression that the resin layer 16 vanishes through abrasion, the resin layer 15 is not wholly peeled by abrasion but is only worn in the extremely small sites of the protuberances in the undulations resembling a swell because the resin layer 16 is attached to the surface of the roll as combined with the ceramic layer 15 formed by thermal spraying. In the area overlying the portions of the surface of large curvature 9*a*, the protuberances of the undulations resembling a swell in which the resin layer 16 has vanished by abrasion expose the ceramic layer 15 and therefore tend to suffer adhesion of the ink. The ink which happens to adhere to the surface of the roller, however, is wiped by the printing sheet and is not allowed to accumulate on the roller because the portions of the surface of large curvature 9*a* produce strong surface pressure and minute slippage with the printing sheet as described above. Naturally, the surface of the printing web ought to be smeared microscopically with the part of the ink which has been wiped from the roller surface by the printing sheet. The ink thus wiped by the printing web imposes absolutely no problem from the standpoint of the quality of print because it adheres in an extremely small quantity to the printing web in the form of minute dots which are incapable of visual detection.

In contrast, on the portions of the surface of small curvature 9*b*, since the surface pressure in the contact with the printing sheet is extremely small as described above, the ebrasion of the resin layer 16 is very small even in the protuberances of the undulations resembling a swell mentioned above. In the area overlying the portions of the surface of small curvature 9*b*, since the low surface energy resin layer 16 is wholly maintained in the uppermost surface part including the protuberances, the adhesion of ink does not easily occur even after a protracted use.

The printing web transporting roller according to this invention, therefore, refrains from inducing the adhesion accumulation of ink for a long time, represses the frequency of cleaning, and enjoys high durability. One of the major objects of cleaning the roller resides in preventing the roller from varying its diameter owing to the accumulation of ink and paper dust on the roller to the extent of inducing the printing web to incur inconveniences such as gathering wrinkles and generating a zigzagging motion. The printing web transporting roller according to this invention can continue its operation for a long time without requiring a cleaning operation because the possibility of the portions of a surface of a large curvature accumulating ink or paper dust is substantially nil.

Incidentally, the cleaning work for the printing web transporting roller according to this invention is as simple as just touching lightly the surface of the roller with dry cloth because the surface uses the low surface energy resin and further because it has a profile of smooth undulations.

Now, the specific construction of the roller according to the present invention will be described further in detail below.

Fiber-reinforced plastics, metals, etc. are used as materials for the roller basis in the printing web transporting roller of this invention.

As concrete examples of the synthetic resin for forming the matrix of the fiber-reinforced plastics, epoxy resins; unsaturated polyester resins; phenol resins; thermosetting resins such as alkyl resins or amide resins such as various species of nylon; polycarbonates; urethane resins; polyacetals; amorphous polyether resins such as polyether sulfones, polysulfones, and polyether imides; and thermoplastic resins including saturated polyester resins such as polyethylene terephthalate and polybutylene terephthalate maybe cited. Among other synthetic resins mentioned above, thermosetting resins and particularly epoxy resins prove to be especially preferable.

As concrete examples of the reinforcing fibers for the fiber-reinforced plastics, carbon fibers, silicon carbide fibers, boron fibers, potassium titanate fibers, and glass fibers may be cited. These species of reinforcing fibers may be used either singly or in the form of a mixture of two or more species. It is particularly preferable to use carbon fibers in a pure form or to use carbon fibers as a main component plus other species of fibers added thereto in a small proportion. The term "carbon fiber-reinforced plastics" as used in the present specification refers not only to a resin using carbon fibers solely as reinforcing fibers but also to a resin incorporating therein carbon fibers mainly (specifically in a proportion of not less than 50%) plus other species of fibers.

The carbon fibers are not particularly discriminated on account of the kind in the sense of classification. They are properly selected from among PAN type, pitch type, and mixtures thereof, depending on the properties to be expected of the roller. It is proper to adopt the pitch type where the resin is required to have a high modulus of elasticity or the PAN type where a very high modulus of elasticity is not called for but economy counts most. The choice between short filaments and long filaments is a matter not to be specifically defined but to be decided by the method of formation which will be described herein below. It is preferable to adopt long filaments where the resin is required to manifest a high modulus of elasticity.

The method for forming the roller bases by the use of the fiber-reinforced plastics of the quality just described is not particularly restricted. Various methods such as, for example, sheet wrapping method, filament winding method, extraction molding method, and resin transfer molding method are available for the formation of the roller basis. When the sheet wrapping method or the filament winding method are adopted for the formation of the roller basis, the fiber-reinforced plastics is wrapped or filament wound on a metallic mandrel and the formed resin consequently obtained is then thermally hardened or thermally fused to give rise to a blank tube. When the extraction method is otherwise adopted, the fiber-reinforced plastics is draw molded by the use of a die of the shape of a pipe wished to be produced to obtain a blank tube. When the resin transfer molding method is adopted for the formation, the fiber-reinforced plastics is molded by the use of a metallic die or a resinous die.

As concrete examples of the material for the metallic roller basis, aluminum, aluminum alloys, iron, and various species of steel may be cited.

The roller basis to be used in this invention must be provided on the peripheral surface thereof with a plurality of portions of a surface of large curvature and a plurality of portions of a surface of small curvature alternately arranged in a mutually adjoining state and further provided on the surface thereof with macroscopic steps.

The pattern of arrangement of the portions of the surface of large curvature and the portions of the surface of small curvature on the peripheral surface of the roller basis is not particularly restricted. A pattern in which a plurality of portions of the surface of large curvature (or the portions of the surface of small curvature) each of a rectangular or circular shape distributed after the pattern of islands in an ocean on the peripheral surface of the roll is conceivable. Preferably, a pattern in which a plurality of portions of the surface of large curvature (or portions of the surface of small curvature) are present in a substantially equal width throughout the entire peripheral surface of the roller basis as mutually separated by portions of the surface of small curvature (or portions of the surface of large curvature) interposed therebetween and a pattern in which the portions of the surface of large curvature (or the portions of the surface of small curvature) are arranged like vertical stripes substantially parallel in the direction of the rotation of the roller are adopted. The pattern of arrangement in the shape of vertical stripes is advantageous in respect that the printing web transporting roller which is ultimately obtained always produces a fixed surface pressure on contacting the area of stated width of the printing web while the roller is in rotation.

When the pattern of arrangement in the shape of vertical stripes is adopted, the portions of the surface of large curvature are preferred to have a width in the approximate range of 30–80 mm. The reason for this specific range is that it will possibly become difficult for the surface pressure with the printing web to be mainly received only at the positions of the portions of the surface of large curvature on the roller basis if the unit width of the portions of the surface of large curvature is smaller than 30 mm and that the surface pressure to be received per unit area at the positions of the portions of the surface of large curvature will decrease possibly to the extent of preventing the printing web from satisfactorily performing the action of wiping the dirt adhering to the printing web if the unit width of the portions of the surface of large curvature is larger than 80 mm.

The ratio of the total area, $a_1$, of the portions of the surface of large curvature to the total area, $a_2$, of the portions of the surface of small curvature is preferably in the range of 1:1–20, and more preferably in the range of 1:2–10. The reason for this specific range is that it will possibly become difficult for the surface pressure with the printing sheet to be mainly received only at the positions of the portions of the surface of large curvature of the roller basis if the ratio of the total area, $a_1$, of the portions of the surface of large curvature is lower than the lower limit of the range and that the surface pressure to be received per unit area at the positions of the portions of the surface of large curvature will decrease possibly to the extent of preventing the printing web from satisfactorily performing the action of wiping the dirt adhering to the printing web if the ratio of the total area, $a_1$, of the portions of the surface of large curvature is higher than the upper limit of the range.

The steps to be produced between the portions of the surface of large curvature and the portions of the surface of small curvature are preferred to fall in the approximate range of 0.1–0.5 mm. The reason for this specific range is that the printing web transporting roller to be ultimately obtained will possibly fail to give rise to a definite difference in surface pressure between the portions of the surface of large curvature and the portions of the surface of small curvature during the contact of the roller with the printing web and will consequently keep the invention from generating the action thereof effectively if the step is smaller than 0.1 mm and that the printing web transporting roller to be ultimately obtained will possibly fail to advance the printing web wholly at a uniform speed in the direction of rotation of the roller during the contact of the roller with the printing web and will induce the printing web to incur such inconveniences as gathering wrinkles and sustaining distortions if the step is larger than 0.5 mm.

The patterns of arrangement, areas, steps, etc. of the portions of the surface of large curvature and the portions of the surface of small curvature on the roller basis which have been described will be manifested in substantially equal numerical values on the surface of the printing web transporting roller to be ultimately obtained.

The portions of the surface of large curvature are preferred to be disposed so as to occupy the positions of the printing web corresponding to those in the white part of print. The portions of the surface of large curvature produce a high surface pressure and tend to allow the adhesion of ink during the contact with the printing web as described above. When they are disposed so as to occupy the positions of the printing web corresponding to those in the white part of print, therefore, the adhesion of ink to the portions of the surface of large curvature is inherently nulled and the defilement of the printing web with the ink transferred thereto is precluded. The defilement of the printing sheet with the transferred ink is such as to defy visual detection. Even when the portions of the surface of large curvature are not disposed so as to occupy positions of the printing web which correspond to those in the white part of print, this failure brings about absolutely no inconvenience from the practical point of view.

The method to be used for forming the portions of the surface of large curvature and the portions of the surface of small curvature as specified above is not particularly restricted. The formation can be attained by subjecting the surface of the blank tube formed of the fiber-reinforced plastics as described above to the work of imparting a step as by cutting. For the blank tube to turn into the roller basis, the blank tube which has undergone the cutting work is generally cut to the prescribed length of the roll and subsequently fitted with a header or a journal. The attachment of the header or journal to the tube can be carried out by a mechanical work, through the medium of an adhesive agent, or both. Thereafter, the roller in process is subjected to the work of grinding and cutting the peripheral part thereof and optionally to the additional work of finishing the seat of a bearing and the bearing part. Alternatively, the roller prior to the attachment of a header or journal thereto may be subjected to the work of grinding the peripheral part thereof, then to the work of attaching the header or journal thereto, and finally to the work of finishing the seat of a bearing or the bearing part. The roller basis requires to acquire accurately the prescribed diameter as by grinding. The reason for this requirement is that the printing web transporting roller according to this invention is incapable of being finished up by such the work of grinding and cutting.

The ceramic layer is formed by thermal spraying on the roller after the portions of the surface of large curvature and the portions of the surface of small curvature aimed at have been formed on the peripheral surface of the roller and the roller has been adjusted to the prescribed outside diameter as by grinding. For the purpose of heightening the adhesive strength between the roller basis made of the fiber-reinforced plastics and the ceramic layer formed by thermal spraying, the roller basis is preferred to be overlain by an undercoating layer prior to the work of forming the ceramic layer by thermal spraying.

The pretreatment which precedes the work of thermal spraying may possibly be effected by coarsening the surface of the roller basis made of the fiber-reinforced plastics by a sanding treatment, a treatment with zinc phosphate, or a blasting treatment. This surface-coarsening operation does not prove very advantageous because it causes severance and disintegration of the fibers of the surface layer part of the basis which is fibrous in quality, encourages the scuffing of fibers, prevents the work of thermal spraying the surface with a ceramic material from forming a homogeneous coat thereon, and suffers the work of forming the coat to pollute the environment by causing the blast material and the basis under treatment to be scattered in fine dust and suspended in the air.

The undercoating layer is not particularly restricted. It nevertheless is preferred to be composed of a substrate film formed of an organic macromolecular material which is the same as or similar with the synthetic resin forming the matrix of the fiber-reinforced plastics of the roller basis and further a surface-coarsened film formed of an organic macromolecular material which is the same as or similar with the synthetic resin forming the matrix of the fiber-reinforced plastics similarly to the surface of the substrate film. It proves most advantageous when the substrate film thereof has a thickness in the range of 30–300 $\mu$m and the surface-coarsened film thereof has a thickness in the range of 50–300 $\mu$m and a surface roughness (Rz) in the range of 40–130 $\mu$m. The organic macromolecular materials which forms the undercoating layer(s) of the composition described above does not need to be limited to the same synthetic resin as what forms the matrix in the fiber-reinforced plastics of the roller basis but may be a synthetic resin of a different kind so long as the two synthetic resins to be selected has satisfactory mutual wettability.

The surface-coarsened film contemplated by this invention is composed of the aforementioned organic macromolecular material which forms a matrix as will be described herein below and a granular solid organic macromolecular material destined to form an aggregate. The surface-coarsened layer only requires the aforementioned organic macromolecular material forming the matrix thereof to be the same as or similar with the synthetic resin forming the matrix in the fiber-reinforced plastics of the roller basis and does not require the solid organic macromolecular material contained in the surface-coarsened layer to be the same as the synthetic resin forming the matrix in the fiber-reinforced plastics of the roller basis but requires it to be a rigid material which is capable of being stably dispersed in the matrix. Undeniably, it is preferred to possess such physical properties including thermal expansion coefficient as approximate those of the organic macromolecular material forming the matrix of the surface-coarsened layer and to belong to the same kind as the organic macromolecular material.

In the construction described above, the substrate film functions to correct the surface of the roller basis and impart smoothness thereto by filling such defects as scuffing and fine voids on the surface of the roller basis and the surface-coarsened film functions to contribute to the improvement of the adhesiveness of the ceramic film formed by thermal spraying.

The undercoating layer described above can be formed, for example, by spray applying a solution obtained by combining an organic macromolecular material with 5–15 wt. % of a diluent to the peripheral surface of the roller basis in a direction substantially perpendicular thereto, drying the applied layer of the solution thereby forming an substrate film, spray applying to the surface of the substrate film a composition obtained by combining an organic macromolecular material with 60–80 wt. % of a granular solid organic macromolecular material, preferably 10–45 μm in diameter, and 30–120 wt. % of a diluent in a direction of less than 90° relative to the peripheral surface of the roll, and drying the applied layer of the composition thereby forming a surface-coarsened film.

In the formation of the substrate film by the procedure mentioned above, if the proportion of the diluent is less than 5 wt. %, the substrate layer to be formed during the spray application of air will be liable to engulf air therein. If the proportion conversely exceeds 15 wt. %, the substrate film will not easily form a smooth film. If the thickness of the substrate film is less than 30 μm, then the substrate film will function only unsatisfactorily as a correcting film for the surface of the roller basis made of the fiber-reinforced plastics and consequently will fail to eliminate the defects of the basis. Conversely, if the thickness exceeds 300 μm, then the roller will possibly be deprived of stability of the final dimensional accuracy thereof.

In the formation of the surface-coarsened layer, if the particle diameter of the granular solid organic macromolecular material is less than 10 μm, this material will not manifest its function as an aggregate. If the particle diameter exceeds 45 μm, the coarsened-surface layer to be formed will bring about the phenomenon of excessive shielding of particles and will possibly fail to improve the adhesive power with the ceramic film to be formed by thermal spraying at the subsequent step. If the proportion of the granular solid organic macromolecular material to be incorporated is less than 60 wt. %, then the complication of the sectional shape of the coarsened surface due to the infiltration into and the collision against the resin component of the material will not be accumulated prominently. If this proportion exceeds 80 wt. %, then the produced layer will receive only insufficient supporting power from the resin component and will possibly fail to improve the adhesive power with the ceramic film to be formed by thermal spraying at the next step. If the proportion of the diluent is less than 30 wt. %, the viscosity of the resin component will decrease the amount of the incorporated granular solid organic macromolecular material to be transferred during the air spray application of the material and will accordingly prevent the coarsened surface from acquiring a satisfactorily complicated cross-sectional shape. If this proportion exceeds 120 wt. %, then the resin component will be short in supply and will fail to manifest satisfactorily the anchoring effect thereof. If the thickness of the layer is less than 50 μm, the layer will acquire only insufficient adhesive power with the substrate layer and will degrade the adhesive power of the ceramic film to be formed by thermal spraying at the next step even when the coarseness of surface is proper. If the thickness conversely exceeds 300 μm, then the coarsened surface will acquire a planar sectional shape and will possibly suffer a decline in the adhesive power with the ceramic film to be formed by thermal spraying at the next step.

In the procedure described above, the surface-coarsened layer which overlies the undercoating layer has been spray applied to the roller basis in a direction of less than 90° relative to the tangent to the peripheral surface of the roller basis. The reason for this particular direction is that when a solution is spray applied in a direction perpendicular to the tangent to the peripheral surface of a cylindrical article, the spray of the solution is halved at the part of perpendicular intersection, caused to flow along the peripheral surface of the cylindrical article while gradually becoming thin from the part of perpendicular intersection, and allowed to form an applied layer of a prescribed thickness by one complete rotation of the cylindrical article and that when the solution is spray applied in a direction of less than 90° relative to the tangent to the peripheral surface, the spray of the solution, after being halved at the part of perpendicular intersection, is caused to flow more in one direction of the peripheral surface than in the other direction and, as a result, the granular solid organic macromolecular material in the spray of the solution is allowed to induce the phenomenon of shielding with granules and, at the same time, produce such actions as seeping into, rubbing against, colliding with, and springing from the resin component in the process of forming an applied layer and give birth to a coarsened surface having a complicated sectional shape.

As a way of performing an undercoating treatment for the formation of the ceramic film by thermal spraying in the printing web transporting roller according to this invention, the procedure which consists in forming the substrate layer and the surface-coarsened layer mentioned above with the same organic macromolecular material as the synthetic resin forming the matrix of the fiber-reinforced plastics of the roller basis proves most favorable. Other known methods such as, for example, the method which, as disclosed in JUM-B-04-7,378, resides in forming an undercoating layer composed of an organic material and an inorganic material are also available. When the undercoating layer is formed of an organic material and an inorganic material destined to constitute itself an aggregate as described above, this method has the possibility of causing separation of the thermal sprayed ceramic layer owing to the difference in thermal expansion caused in the undercoating layer, the roller basis made of the fiber-reinforced plastics, and the thermal sprayed ceramic film by the heat used during the thermal spraying and has an enormous possibility of being inferior, in terms of yield of product and durability of product, to the method which resorts to a procedure of forming the substrate layer and the surface-coarsened layer with the same organic macromolecular material as the synthetic resin forming the matrix of the fiber-reinforced plastics of the roller basis.

On the surface of the roller basis which is made of the fiber-reinforced plastics or on the surface of the undercoating layer mentioned above, the thermal sprayed ceramic layer is formed by the known method of thermal spraying a ceramic substance such as, for example, the plasma jet thermal spraying method. As concrete examples of the ceramic material, $Al_2O_3$, $TiO_2$, $Al_2O_3$—$TiO_2$, $Cr_2O_3$, $ZrO_2$, WC, WC-Co, $Cr_3C_2$, TiC, mixtures thereof, complexes formed by simultaneously thermal spraying ceramic and metallic substances for impartation of electroconductivity, and cermets may be cited, though not exclusively. The ceramic material may be selected in consideration of the adhesive strength exhibited to the roller basis or the undercoating layer, the resistance to abrasion, the requirement that the ceramic layer produced by thermal spraying should contain minute pores (open pores), several μm—some tens of μm in diameter, at a porosity in the range of 5–20%, and possess surface roughness, Rz, in the approximate range of 20–50 μm as well as the economy. Generally, it is preferable to select white alumina (W-$Al_2O_3$), gray alumina (G-$Al_2O_3$) ($Al_2O_3$—$TiO_2$), or chromia ($Cr_2O_3$), for example.

The reason for the requirement that the thermal sprayed ceramic layer should contain minute pores (open pores), several μm—some tens of μm in diameter, at a porosity in the range of 5–20% is that this requirement enables the ceramic layer to be stably combined with the aforementioned low surface energy resin layer. If the porosity is less than 5%, then the low surface energy resin will fail to seep satisfactorily into the ceramic layer and will possibly dispose the ceramic layer to liability to separation. If the porosity conversely exceeds 20%, the ceramic layer which is destined to constitute itself the skeleton of the composite film will possibly suffer loss of strength. The reason for the requirement that the ceramic layer should possess surface roughness, Rz, in the approximate range of 20–50 μm, is that this requirement enables the ceramic layer, when the low surface energy resin of the quality which will be described specifically herein below is accumulated on the surface thereof, to allow stable adhesion thereto of the low surface energy resin and render the ultimate formation of smooth and satisfactorily large undulations easy.

This thermal sprayed ceramic layer is expected to have an average thickness in the approximate range of 30–200 μm, preferably 40–80 μm. The reason for this specific range is that the ceramic layer to be produced will possibly fail to manifest such characteristics as homogeneity, tightness of adhesion, strength, and wear resistance satisfactorily if the average thickness is less than 30 μm and that the produced ceramic layer will prove disadvantageous in terms of cost if the average thickness exceeds 200 μm.

The thermal sprayed ceramic layer is generally expected to have surface roughness, Rz, in the approximate range of 20–50 μm. The optimum surface roughness which is required by the finished product varies with the kind of the relevant roller. The guide roller in the printing device such as, for example, a gravure press which prints on a thin film is expected to have a final surface roughness, Rz, finer than the typical approximate range of 15–40 μm. The ceramic layer after being formed by the thermal spraying, when necessary for the sake of obtaining this final roughness, may be given light surface grinding.

After the ceramic layer has been formed by the thermal spraying as described above, the resin in a liquefied form is caused to impregnate this ceramic layer from above by such a method as spraying, dipping, brushing, or spreading with a roller and the applied layer of the liquefied resin is dried until solidification at the prescribed temperature to form a resin layer on the surface of the ceramic layer and in the pores of the layer. The resin to be used in forming this resin layer in this invention is preferred to be capable of forming a solid possessing a low energy surface. Though the low surface energy resin imposes no restriction particularly but requires only to be capable of forming a film, preferably a film of high rigidity, exhibiting low wettability to the ink to be used and enjoying stability to resist the chemical agent used in the composition of the ink. Generally, it is preferred to be a silicone type resin or a fluorine atom-containing resin. In terms of rigidity, workability, chemical stability, etc., the silicone type resin proves particularly advantageous. The low surface energy resin must be prepared in a liquefied form when it is elected to form a coat on the thermal sprayed ceramic layer. It may be used in the form of a reactive composition containing a monomer, oligomer, or prepolymer, a dilute composition obtained by dissolving a polymer with a solvent, or a solution resulting from dissolving a polymer, depending on the kind of resin.

The silicone type resin has only to satisfy the requirement that it be capable of forming a stable rigidified film possessing a skeletal structure having a Si—O—Si bond and an organic group, preferably methyl group and/or phenyl group, and more preferably methyl group, as main components thereof after undergoing a treatment for heightening molecular weight or forming three-dimensional configuration subsequently to a relevant processing. The wettability of the silicone type resin relative to the ink decreases in proportion as the amount of methyl groups as a side chain increases. From the viewpoint of exalting the rigidity of the film, the ratio of the content of the cross-linked structure owing to the functional group such as phenyl group or vinyl group is preferred to be heightened. Further, the silicone type resin is preferred to be particularly of the condensation reaction type in the sense that the resin of this type abounds in density of cross-linkage, excels in resistance to abrasion, and enjoys a perfect ink releasing property.

The silicone type resin is not particularly discriminated on account of the form which is assumed by the resin on being subjected to a relevant processing. The form may be properly selected from among liquids of oligomers, monomers, etc. and solutions obtained by dissolving resinous raw materials with a suitable solvent such as, for example, various known compositions which are sold in the market as sorted under the designations of silicone varnishes and silicone rubbers. Specifically, most compositions which are sold in the market under the designation of varnish type silicone mold release agents and compositions similar thereto prove preferable in terms of workability and properties of the film to be produced. Among the silicone mold release agents, those which have a silicone polymer or copolymer possessing a structure represented by the following general formula (I) are available as commercial products.

(I)

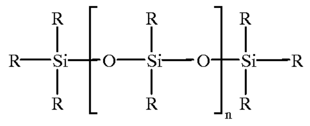

(wherein R's independently denote hydroxy group, alkyl, aryl, alkenyl, halogen-substituted alkyl, halogen-substituted aryl, halogen-substituted alkenyl, and preferably methyl group, and n is an integer in the range of 1–30000)

Naturally, the silicone type resin composition to be used herein does not need to be limited in any respect to the silicone mold release agent of this description.

The silicone type resin composition described above, when necessary, is allowed to incorporate therein such a filler as minute silica particles capable of heightening the rigidity of a film. The filler thus incorporated, however, requires to possess such a particle diameter as permits the filler to seep satisfactorily into the pores and the depressions in the ceramic layer.

The fluorine atom-containing resin to be used effectively herein is a thermoplastic fluorine atom-containing resin. As concrete examples of this resin, polychlorotrifluoroethylene, polyvinylidene fluoride, and polyvinyl fluoride may be cited. It can be put to use by the dispersion processing method which comprises suspending this resin in or swelling it with a suitable solvent, applying the suspension or impregnated resin to the thermal sprayed ceramic layer, and heating the applied layer to a temperature higher than the melting point thereby producing a film. For the sake of forming this film infallibly on the surface of the ceramic layer and inside the pores of the ceramic layer as well, a thermosetting fluorine atom-containing resin which contains a small amount of a functional group such as hydroxyl group or carboxylic acid group in the molecular chain, allows application to a surface in a liquid state, and cross-links and rigidifies at normal room temperature or elevated temperature proves more advantageous. As concrete examples of the thermosetting fluorine atom-containing resin, copolymers of fluoroethylene with acrylic acid and methacrylic acid may be cited.

As the low surface energy resin, mixtures of silicone type resins with fluorine atom-containing resins, particularly mixtures of addition reaction grade silicone type resins with fluorine atom-containing resins, or mixtures of such silica type resin coating materials as BERUKURIN (made by Nippon Oils & Fats Co., Ltd.) or silicone hard coats with silicone type resins can be used. By combining these different types of resin, a fluorine atom-containing resin which combines outstanding properties such as resistance to wear, resistance to solvents, and resistance to chemicals, never attainable by any simple resin can be prepared.

The thickness of the resin layer formed on the surface of the ceramic layer cannot be easily defined as average wall thickness because the resin layer is deposited in a large thickness on the depressions of the pitch waves and in a small thickness on the protuberances of the pitch waves of the ceramic layer as described above. The resin layer, however, is preferred to be deposited on the surface of the ceramic layer in a thickness in the approximate range of 0.5–20 $\mu$m throughout the entire area for the purpose of enabling this resin layer to cover the surface of the ceramic layer substantially wholly and allowing the ceramic layer to maintain the swell undulations thereof.

The printing web transporting roller of this invention which is obtained as described above macroscopically retains in the ultimately formed surface thereof the stepped structure formed of the portions of a surface of a large curvature and the portions of a surface of a small curvature and possessed by the roller basis. Locally, or microscopically one portion of a curved surface possesses smooth undulations. Typically, these undulations are preferred to have surface roughness, Rz, in the approximate range of 10–40 $\mu$m. On the ultimately formed surface, the protuberances of the smooth undulations are preferred to be uniformly dispersed at an approximate ratio of one piece per in the range of the square of 20 $\mu$m—the square of 100 $\mu$m, preferably in the range of the square of 30 $\mu$m—the square of 60 $\mu$m. The whole surface is formed of the low surface energy resin layer of dense texture retained as a composite coating film on the thermal sprayed ceramic layer and it exhibits low wettability to the ink to be used.

The printing web transporting roller of this invention, as described above, is characterized by the fact that the roller basis comprises a roller basis made of a fiber-reinforced plastics and provided on the peripheral surface thereof with a plurality of portions of a surface of large curvature and an plurality of portions of a surface of small curvature alternately arranged in a mutually adjoining state and a composite coating film superposed on the roller basis and composed of a porous ceramic layer formed by thermal spraying and a resin layer formed on the surface of the ceramic layer and inside the pores in the ceramic layer. Thus, this roller allows no adhesion accumulation of ink on the surface thereof, keeps this characteristic substantially intact even after a protracted use, and excels in durability. When the roller basis uses such a fiber-reinforced plastics as carbon fiber-reinforced plastics, it features light weight and high rigidity, avoids emitting vibration or noise even when it is rotated at a high speed, and permits delicate control of tension on the printing web.

The roller of this invention, therefore, can be utilized advantageously as various types of roller to be disposed in the printing web impressing/transporting system in a a varying printing press. To be more specific, it can be advantageously used as guide rollers in rotary offset presses (newspaper rotary offset presses, commercial rotary offset presses, and business forms printing presses), web-fed rotary gravure presses, flexographic rotary presses, and rotary letterpress machines, for example. It can be used particularly in high-speed rotary presses. As described above, the printing web transporting roller of this invention allows no adhesion accumulation of ink on the surface thereof even after protracted use and only sparingly requires the surface thereof to be given a cleaning work. Even when the adhesion of ink happens to occur on the roller surface, the adhering ink can be easily removed with a dry cloth or a petroleum type solvent. Thus, the cleaning operation of the roller which has heretofore been extremely difficult to perform and has called for arduous labor can be turned into a very easy work.

The roller of this invention which is constructed as described above finds utility not merely in the field of printing devices but equally in the processing of a filmy article having a viscous transitional substance imparted to the surface thereof similarly to the ink on printed matter as mentioned above. Apparently in the processing of a filmy article, this roller performs its role highly satisfactorily as evinced by precluding the defilement with the viscous transitional substance and exhibiting high durability. As an apt example of the utility other than that for the printing web transporting roller in the field of printing devices, the rollers in the copying sheet impressing/transporting systems in various copying devices may be cited, though not exclusively.

EXAMPLES

Now, this invention will be described more specifically below with reference to working examples thereof, which are illustrative of and not limitative in any respect of the present invention.

Example 1

A blank tube (L in length×100 mm in diameter; the length L is capable of guiding a newspaper roll A specified in JIS [Japanese Industrial Standard] P3001) was manufactured by attaching flange shafts each adapted to serve as a rotary shaft for a roller to the opposite ends of a hollow cylinder made of a carbon fiber-reinforced epoxy plastics (CFRP) produced by the filament winding technique. Steps having such a surface contour as illustrated in FIG. 1 (total area of portions of a large diameter: total area of portions of a small diameter about 1:5) were imparted by a cutting work to the blank tube. Thereafter, the blank tube was turned into a roller basis by finely adjusting the outside diameters and smoothing the surface contours of the blank tube as by grinding.

The surface of this CFRP roller basis was cleaned with thinner. Then, an epoxy resin (made by Dainippon Toryo K.K. and commercialized under the trademark "EPONIKIUSU#10"), the same organic macromolecular material as the matrix of the CFRP roller basis, having a composition of main agent/curing agent 100/100 (ratio by weight) and 100 wt. % of thinner as a diluent and 80 wt. % of a granular solid organic macromolecular material, less than 45 $\mu$m in grain size, (made by US Technology Far East Corp. and commercialized under the trademark designation of "POLYPLUS") were stirred together. The composition consequently obtained was spray applied to the stepped CFRP roller basis in a direction tilted by 30° from the direction perpendicular to the tangent of the peripheral surface of the roller basis. The applied layer of the composition formed on the roller basis was dried and solidified at 80° C. for one hour 30 minutes to form a surface-coarsened layer, 100 μm in wall thickness and 80 μm in surface roughness, Rz).

Thereafter, on the peripheral surface of the CFRP roller basis consequently furnished with the surface-coarsened layer, a G-$Al_2O_3$ ($Al_2O_3$-2.3% $TiO_3$) having particle diameters in the range of 10–44 μm was thermal sprayed by the use of a plasma thermal spray device (made by Meteco K.K. and commercialized under the trademark designation of "METECO 10MB") to form a thermal sprayed ceramic layer, 100 μm in wall thickness and 50 μm in surface roughness, Rz. The surface of the thermal sprayed ceramic layer was lightly ground with sand paper (#120) to be finished with surface roughness, Rz, of 45 μm.

Then, on the thermal sprayedceramic layer, a solution obtained by stirring 100 parts of a silicone type resin mold release agent (made by Shin'etsu Chemical Industry Co., Ltd. and commercialized under the product code of "X-62-630B"), 100 parts of toluene, and 3 parts of a curing catalyst (made by Shin'etsu Chemical Industry Co., Ltd. and commercialized under the product code of "CAT-PS-3") was spray applied. The applied layer of the solution was dried and solidified in a drying oven at 110° C. for one hour to form a silicone type resin film on the surface of the thermal sprayed ceramic layer. This silicone type resin film thoroughly occluded the open pores in the ceramic layer and, completely covered the whole surface of the ceramic layer as deposited in a large thickness on the depressions of the undulations resembling a pitch wave and in a small thickness on the protuberances thereof. Though the wall thickness of the silicone type resin layer varied with the relative position in the surface area, it fell completely within the range of 2–20 μm. The surface coarseness, Rz, of the roller basis was in the approximate range of 27–33 μm after the formation of this silicone type resin film.

The guide roller thus obtained was subjected to the trial printing which will be described herein below.

Control 1:

A blank tube (having the same size as the blank tube used in the example cited above) was manufactured by attaching flange shafts each adapted to serve as a rotary shaft for a roller to the opposite ends of a hollow cylinder made of a carbon fiber-reinforced epoxy resin (CFRP) produced by the technique of filament winding and then adjusting the outside diameters and smoothing the surface contours of the blank tube as by grinding. The blank tube of the shape of a straight tube was used in its unmodified form as a roller basis. This roller basis was subjected to the formation of a coarsened surface, the thermal spraying of a ceramic material, and the application of a silicone type resin mold release agent in the same manner as in Example 1 to produce a guide roller for comparison. This guide roller was subjected to the trial printing as follows.

Trial Printing:

The guide rollers manufactured in Example 1 and Control 1 mentioned above were severally set in place directly behind a printing part in a satellite unit (four-color printing) of a newspaper rotary offset press (made by Kabushiki Kaisha Tokyo Kikai Seisakusho) and put to an actual shop operation. The ink used in the trial printing was a product of Toyo Ink K.K. commercialized under the trademark designation of "Shinbun Ink New King". The rotary press was operated at a speed of 130,000 copies/hour and at a rate of 220,000 copies/day.

In the trial printing using the guide roller of Control 1, the roller required no cleaning work during the first month of operation. During the subsequent six months' operation, the frequency of cleaning work gradually increased to once per two weeks and once per week. This guide roller was found to be significantly effective in precluding adhesion of ink as compared with the standard chromium-plated roller which requires a cleaning work after the printing of morning issue and evening edition daily. It nevertheless was fully satisfactory in terms of durability.

In contract, in the trial printing using the guide roller of Example 1, the roller continued its operation smoothly without developing any trouble even after the elapse of six months in spite of the fact that no cleaning work was given to the roll meanwhile.

Generally, the advance of the defilement of the roller by use notably varies with the viscosity of the ink and the quality of paper to be used in the printing. The ink used in the trial printing mentioned above had high viscosity and was liable to gather dirt. In spite of the use of thin ink, the roller of Example 1 according to this invention showed absolutely no sign of adhesion of ink on the surface thereof for a long time. This fact clearly shows that this roller possesses an outstanding quality.

The entire disclosure of Japanese Patent Application No. 9-333340 filed on Dec. 3, 1997 including specification, claims, drawings and summary are incorporated herein by reference in its entirety.

What is claimed is:

1. A printing web transporting roller incorporated in a printing web impressing and transporting system for impressing against a printing element one of a printing sheet and web and then transporting it in a printing device comprising:

a roller basis;

an undercoating layer overlaid on said roller basis;

a composite coating film superposed on said undercoating layer;

said roller basis having formed on a peripheral surface thereof a plurality of portions of a surface of large curvature and a plurality of portions of a surface of small curvature alternately arranged in a mutually adjoining state, wherein said plurality of portions of the surface of large curvature are present throughout the entire periphery of said roller basis and the width thereof is in the range of 30–80 mm;

said roller basis being formed of fiber-reinforced plastics;

said undercoating layer being composed of a substrate film and a surface-coarsened film formed onto the substrate film, wherein said substrate film is formed of an organic macromolecular material and has a thickness of 30–300 μm and said surface-coarsened film is formed of an organic macromolecular material and has a thickness of 5–300 μm and has a surface roughness (Rz) in the range of 40–130 μm; and said composite coating film comprising a porous ceramic layer formed by thermal spraying and a resin layer formed on a surface of said ceramic layer and inside pores in said ceramic layer, wherein said resin layer is formed of a resin for forming a solid of low energy surface.

2. A printing web transporting roller according to claim 1, wherein said resin layer is formed of a resin selected from the group consisting of silicone resins, fluorine atom-containing resins and mixtures thereof.

3. A printing web transporting roller according to claim 1, wherein said resin layer is formed of a silicone resin.

4. A printing web transporting roller according to claim 1, wherein said substrate film is formed of the same organic macromolecular material as that forming a matrix of said fiber-reinforced plastics, and wherein the matrix of said surface-coarsened film is formed of the same organic macromolecular material as the synthetic resin forming the matrix of said fiber-reinforced plastics.

5. A printing web transporting roller according to claim 1, wherein said roller basis is a roller made of a carbon fiber-reinforced plastics.

6. A printing web transporting roller according to claim 1, wherein the ratio of the total area, $a_1$, of said portions of the surface, of large curvature to the total area, $a_2$, of said portions of the surface of small curvature is in the range of 1:1–20.

7. A printing web transporting roller according to claim 6, wherein steps to be formed between said portions of the surface of large curvature and said portions of the surface of small curvature have a height in the range of 0.1–0.5 mm.

8. A printing web transporting roller according to claim 1, wherein steps to be formed between said portions of the surface of large curvature and said portions of the surface of small curvature have a height in a range of 0.1–0.5 mm.

9. A printing web transporting roller according to claim 1, wherein said portions of the surface of large curvature are disposed at positions corresponding to those of a white part of a print to be produced on the printing sheet or web.

10. A printing web transporting roller according to claim 1, wherein said roller has surface attributes such that portions of a surface of an identical curvature possess smooth undulations, having a 10–40 μm surface roughness (Rz).

11. A printing web transporting roller according to claim 1, wherein said roller is a guide roller for use in a rotary press.

12. A filmlike processing roller having a viscosity-transporting substance imparted to the surface thereof, comprising a roller basis, an undercoating layer overlaid on said roller basis, and a composite coating film superposed on said undercoating layer, said roller basis being made of a fiber-reinforced plastics and having on a peripheral surface thereof with a plurality of portions of a surface of large curvature and a plurality of portions of a surface of small curvature alternately arranged in a mutually adjoining state, said undercoating layer being composed of a substrate film and a surface-coarsened film formed onto the substrate film, wherein said substrate film has a thickness of 30–300 μm and is formed of an organic macromolecular material, and wherein said surface-coarsened film has a thickness of 50–300 μm is formed of an organic macromolecular material and has a surface roughness (Rz) in the range of 40–130 μm said composite coating comprising a porous ceramic layer formed by thermal spraying and a resin layer formed on a surface of said ceramic layer and inside pores in said ceramic layer, wherein said resin layer is formed of a resin for forming a solid of low energy surface.

13. A printing web transporting roller incorporated in a printing web impressing and transporting system for impressing against a printing element one of a printing sheet and web and then transporting it in a printing device comprising:

a roller basis;

an undercoating layer overlaid on said roller basis;

a composite coating film superposed on said undercoating layer;

said roller basis having formed on a peripheral surface thereof a plurality of portions of a surface of large curvature and a plurality of portions of a surface of small curvature alternately arranged in a mutually adjoining state, wherein a ratio of total area, $a_1$, of said portions of the surface of large curvature to total area, $a_2$, of said portions of the surface of small curvature is in the range of 1:1–20;

said roller basis being formed of fiber-reinforced plastics;

said undercoating layer being composed of a substrate film and a surface-coarsened film formed onto the substrate film, wherein said substrate film has a thickness of 30–300 μm and is formed of an organic macromolecular material and said surface-coarsened film has a thickness of 50–300 μm in thickness is formed of an organic macromolecular material and has a surface roughness (Rz) in the range of 40–130 μm; and said composite film coating comprising a porous ceramic layer formed by thermal spraying and a resin layer formed on a surface of said ceramic layer and inside pores in said ceramic layer, wherein said resin layer is formed of a resin for forming a solid of low energy surface.

14. A printing web transporting roller according to claim 13, wherein steps to be formed between said portions of the surface of large curvature and said portions of the surface of small curvature have a height in a range of 0.1–0.5 mm.

15. A printing web transporting roller according to claim 13, wherein said roller has surface attributes such that portions of a surface of an identical curvature possess smooth undulations having a surface roughness (Rz) of 10–40 μm.

16. A printing web transporting roller according to claim 13, wherein said roller is a guide roller for use in a rotary press.

17. A printing web transporting roller incorporated in a printing web impressing and transporting system for impressing against a printing element one of a printing sheet and web and then transporting it in a printing device, comprising:

a roller basis;

an undercoating layer overlaid on said roller basis;

a composite coating film superposed on said undercoating layer;

said roller basis having formed on a peripheral surface thereof a plurality of portions of a surface of large curvature and a plurality of portions of a surface of small curvature alternately arranged in a mutually adjoining state, wherein steps to be formed between said portions of the surface of large curvature and said portions of the surface of small curvature have a height in a range of 0.1–0.5 mm;

said roller basis being made of fiber-reinforced plastics, said undercoating layer being composed of a substrate film and a surface-coarsened film formed onto the substrate film, wherein said substrate film has a thickness of 30–300 μm and is formed of an organic macromolecular material, and wherein said surface-coarsened film has a thickness of 50–300 μm is formed of an organic macromolecular material and has a surface roughness (Rz) in the range of 40–130 μm; and said composite film comprising a porous ceramic layer formed by thermal spraying and a resin layer formed on a surface of said ceramic layer and inside pores in said ceramic layer, wherein said resin layer is formed of a resin for forming a solid of low energy surface.

18. A printing web transporting roller according to claim 17, wherein said roller has surface attributes such that portions of a surface of an identical curvature possess smooth undulations having a surface roughness (Rz) of 10–40 $\mu$m.

19. A printing web transporting roller according to claim 17, wherein said roller is a guide roller for use in a rotary press.

* * * * *